United States Patent [19]

Jürgens et al.

[11] Patent Number: 5,010,986
[45] Date of Patent: Apr. 30, 1991

[54] BRAKEBAND

[75] Inventors: Gunter Jürgens, Stuttgart; Jürgen Pickard, Wernau; Werner Sell, Quierschied, all of Fed. Rep. of Germany

[73] Assignee: Daimler-Benz Aktiengesellschaft, Stuttgart, Fed. Rep. of Germany

[21] Appl. No.: 442,654

[22] Filed: Nov. 29, 1989

[30] Foreign Application Priority Data

Dec. 7, 1988 [DE] Fed. Rep. of Germany ....... 3841096

[51] Int. Cl.$^5$ .............................................. F16D 65/06
[52] U.S. Cl. .............................. 188/250 H; 188/77 W; 192/81 R; 192/107 T
[58] Field of Search ................... 188/249, 250 H, 259, 188/77 W; 192/81 R, 107 T

[56] References Cited

U.S. PATENT DOCUMENTS

| 1,580,270 | 4/1926 | Williams | 188/77 W |
| 2,975,870 | 3/1961 | Vosler et al. | |
| 4,102,441 | 7/1978 | Kohlhage | 188/259 X |
| 4,757,880 | 7/1988 | Grzesiak | 188/259 X |

FOREIGN PATENT DOCUMENTS

| 1248884 | 1/1989 | Canada | 188/77 W |
| 230727 | 8/1987 | European Pat. Off. | |
| 356460 | 7/1922 | Fed. Rep. of Germany | 192/81 R |
| 472566 | 3/1929 | Fed. Rep. of Germany | 192/81 R |
| 2632796 | 1/1978 | Fed. Rep. of Germany | |
| 3207838 | 4/1983 | Fed. Rep. of Germany | |
| 647832 | 12/1950 | United Kingdom | |

Primary Examiner—George E. A. Halvosa
Attorney, Agent, or Firm—Evenson, Wands Edwards, Lenahan & McKeown

[57] ABSTRACT

In a brakeband, two side bands extend from a connecting portion in one circumferential direction and a middle band located axially between these side bands extends from it in the other circumferential direction. The band ends of the two side bands (located opposite the connecting portion) are widened in the direction of the middle band, while the middle band is narrowed at its circumferentially corresponding band region. This provides a larger cross-section for the welded joint between the respective widened band ends of the two side bands and a circumferentially adjacent thrust piece of the brake actuating device.

8 Claims, 1 Drawing Sheet

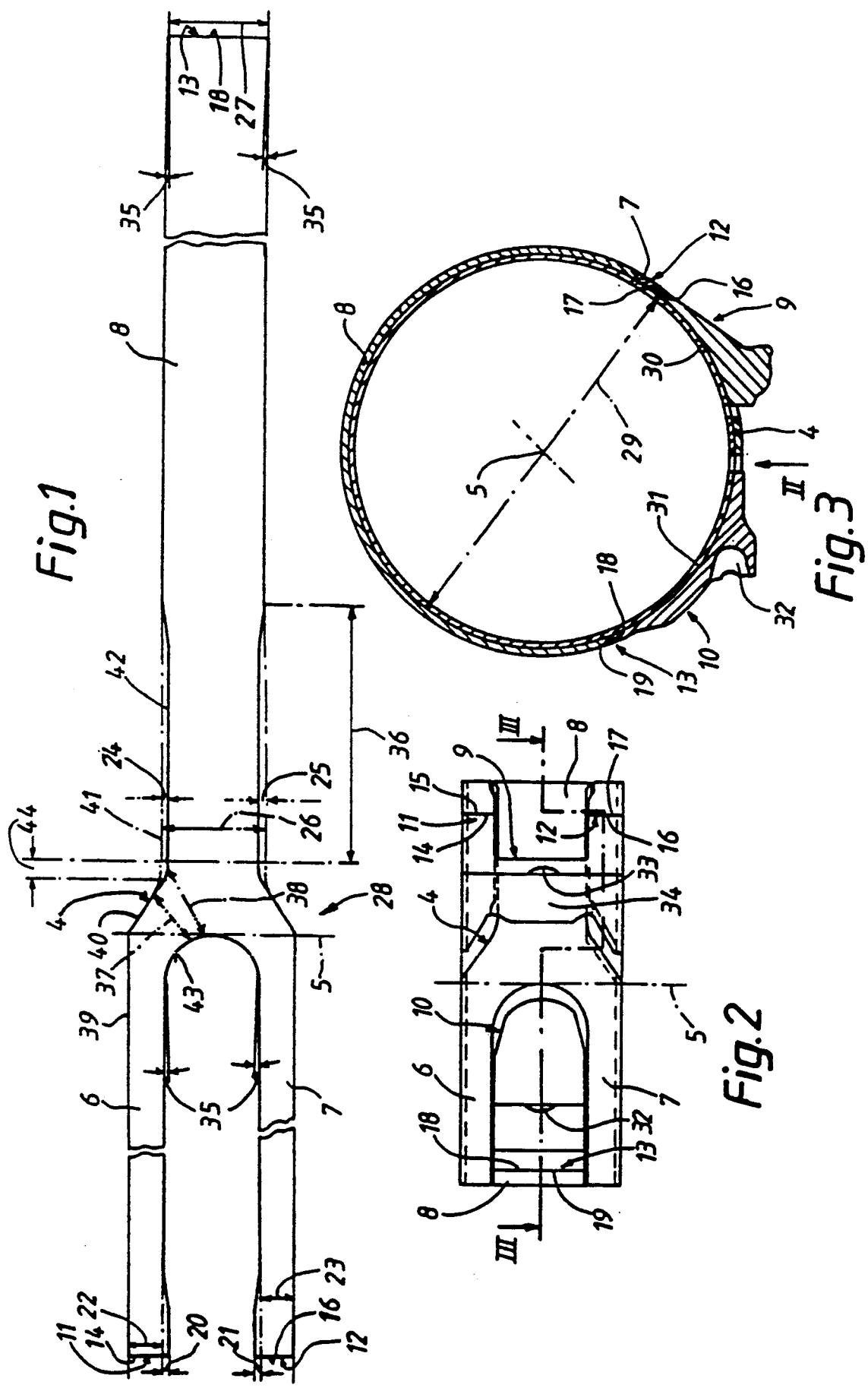

BRAKEBAND

BACKGROUND AND SUMMARY OF THE INVENTION

The invention relates to a brakeband having two side bands portions which branch off from a central connecting portion in one circumferential direction of the axis of rotation of the brake and a middle band portion located axially between these two side band portions to branch off from it in the other circumferential direction. A thrust piece is located circumferentially adjacent to each of free band ends of the two side band portions, which are located opposite the connecting portion and circumferentially mutually confronting free end faces of the two side band portions and a band end of the adjacent thrust piece are welded to one another. It is considered advantageous that there are no circumferentially overlapping parts at the joints between band end and thrust piece, and that the inner faces of the two parts have a common constructional diameter during the operation of the brake.

In a known brakeband of this general type (U.S. Pat. No. 2,975,870), the two side band portions and the middle band portion each have the same width in the direction of the axis of rotation of the brake, even through the middle band works as the leading brake band end and therefore, because of the known especially high servo effect in a double-wound brakeband, is subjected to substantially higher stress than the two side bands portions together.

In a known brakeband of a different type (German Offenlegungsschrift 3,207,838), the thrust pieces are welded to the respective band ends in a circumferentially overlapping manner. There the thrust piece of the middle band portion is widened in the two directions of the axis of rotation of the brake and is thereby guided axially in corresponding recesses of the two side bands which are narrowed. The band ends of the two side bands are welded to a common thrust piece in an overlapping manner.

In a further known brakeband of a different type (G.B. Patent Specification 647,832), the middle band is twice as wide as each of the side bands. There the thrust pieces are made cuboid and are placed vertically on the outer face of the respective band ends and with their major axis radial to the axis of rotation of the brake.

The object of this instant invention is to make it possible to reduce the stress on the middle band, even when the latter is used as a leading brake band end, by increasing its band cross-section without at the same time having to increase the total width of the brakeband.

This object is achieved in an advantageous way by having the free band ends of side band portions widened in the direction of the axis of rotation of the brake in the axial direction pointing to the middle band and by having the middle band narrowed at its region located adjacent the connecting portion and axially oPposite the widened band end. The invention makes it possible to obtain a substantial widening of the middle band, because a sufficiently large weld-seam cross-section (at the juncture between the thrust piece and the free band ends) is still made available at the free band ends of the side bands, despite the narrowing of these bands necessary for the desired preservation of the total width of the brake band. The invention additionally affords the possibility of achieving a more favorable stress pattern in the connecting portion, at the transition between side bands and middle band, in the event that the brake band is stamped out of a one-part sheet metal pressing in such a way that the connecting portion is in one piece with the bands even in the final state of the brake band. Since the widened band ends are located in that band region of the middle band adjoining the connecting portion, this band region can be narrowed in such a way that the critical stress cross-section in the connecting portion is increased. The stress cross-section is limited by the transition of the axially inner side face of the associated side band into the connecting portion. As a result of the narrowing of the middle band, the transition of the side face of the middle band can be offset circumferentially by a larger amount (in relation to the transition of the said inner side face of the associated side band), which results in an increase of the above-mentioned critical stress cross-section between the said transitions to the connecting portion.

In the brake band according to the invention, the outlay in terms of material is no higher than in a normal two side band brake band.

In the brake band according to the invention, the danger of wear at the widened band ends of the side bands is reduced because the rigidity of these bands at their ends is increased.

Whereas, in the known brake bands described, the connecting portion (holding the middle and side bands together) forms a separate component which is either welded or connected in an articulated manner to the individual bands, in the brake band according to the invention, the connecting portion (together with the three individual bands) can form a one-piece sheet metal pressing, even in the finished state.

Whereas, in the referenced known brake bands, each of the three band ends is welded to a separate thrust piece, in the brake band according to the invention the band ends of the two side bands are welded to a common thrust piece.

In the brake band according to the invention, the middle band can advantageously have a width which is larger than the total width of the two side bands.

Other objects, advantages and novel features of the present invention will become apparent from the following detailed description of the invention when considered in conjunction with the accompanying drawings.

BRIEF DESCRIPTION OF THE DRAWING

In the drawing FIG. 1 shows the developed view of a brake band basic body, stamped out from a one piece sheet metal pressing, as further illustrated in FIGS. 2 and 3, FIG. 2 shows a brake band according to the invention, taken in the direction of the arrow II of FIG. 3 and FIG. 3 shows a section through the brake band according to the invention along the line III—III of FIG. 2.

DETAILED DESCRIPTION OF THE DRAWING

Referring to FIG. 1, a basic body 28 is stamped out from a one piece sheet metal pressing and consists essentially of a connecting portion 4, located approximately centrally in the circumferential direction in relation to the axis of rotation 5—5 of the brake, two narrow side bands 6 and 7 branching off from the connecting Portion 4 in one circumferential direction and a wide middle band 8 branching off from the connecting portion 4 in the other circumferential direction.

A thrust piece 9, belonging to the side bands 6 and 7, has a cylindrical inner shell surface 30 with a diameter 29 (lying concentrically relative to the axis of rotation 5—5 of the brake in the tensioned state) and two radial end faces 15 and 17, each welded, respectively, to a corresponding end face 14 and 16 of a band end 11 or 12 of the two side bands 6 and 7.

Correspondingly, a thrust piece 10 (belonging to that brake band end 13 of the middle band 8 and located at an opposite and from that of the connecting portion) is equipped with a cylindrical inner shell surface 31 which is concentric relative to the axis of rotation 5—5 of the brake in the tensioned state and has the diameter 29. The brake band end 13 and thrust piece 10 have mutually confronting end faces 18 end 19 which are welded to one another. The thrust Piece 10 has, on its outer circumference, a central receptacle 32 in the form of a conical, terminally spherical blind hole for the engagement of a bolt-like thrust piece of the brake actuating device. A middle part 34 of the thrust piece 9 spanning the middle band 8 is correspondingly equipped with a receptacle 33.

To obtain the necessary movement play between the side bands 6, 7 on the one hand and the middle band 8 on the other hand, these bands narrow in the direction of their particular band ends 11 or 12 or 13 located opposite the connecting portion 4. This is accomplished by having the side faces of the middle band 8 and the axially inner side faces of the side bands 6 and 7 inclined at an acute angle 35 to the circumferential direction. However, according to the invention, the theoretical width 22 or 23 of the band ends 11 and 12 of the side bands 6 and 7, which is obtained as a result of this narrowing, is increased by a specific differential amount 20 or 21 (in the direction of the axis of rotation 5—5 of the brake pointing to the middle band in the final state) in order to increase the cross-section area for the respective welded joint between the thrust Piece 9 or 10 and the associated band end 11 and 12 or 13. So as to not impair the said movement play between the bands 6, 7 and 8, the middle band 8 is narrowed in its region 36 located opposite the widened band ends 11 and 12 in the installed state. That is, the theoretical width 26 obtained from the width 27 of the band end 13 and the angles of inclination 35 in the region 36 is reduced by the differential amounts 24 and 25.

The stress pattern from the side band 6 via the connection portion 4 to the middle band 8 is represented by dot-and-dash lines in FIG. 1. The invention has afforded the possibility of replacing the smaller and therefore more critical stress cross-section 37 of the brake band, according to the starting point of the invention, with a larger and less critical stress cross-section 38. At the same time, the particular critical stress cross-section is limited by the outer transition of the side face 40 of the connecting portion 4 adjoining the axially outer side face 39 of the relevant side band 6 into the associated side face 41 or 42 of the middle band and, by the inner transition of the axially inner side face 43 of the respective side band 6 into the connecting portion 4. The outer transition (from the side face 40 of the connecting portion 4 into the side face 42 of the narrowed region 36 of the middle band 8) has been offset by a distance 44 (in the circumferential direction pointing to the band end 13) relative to the outer transition of the side face 40 into the original side face 41 of the non-narrowed middle band 8, so that the above-described increase in the critical stress cross-section (38 larger than 37) is obtained.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A brakeband having two side band portions which branch off from a central connecting portion in one circumferential direction of an axis of rotation of a brake;
   a middle band portion, located axially between these two side band portions, which branches off from the connecting portion in an opposite circumferential direction;
   a thrust piece located circumferentially adjacent to each of free band ends of the two side band portions;
   wherein circumferentially mutually confronting free end faces of the two side band portions and of the adjacent thrust piece are welded to one another;
   wherein the free band ends of the side band portions are widened in the direction of the axis of rotation of the brake, in an axial direction pointing only toward the middle band, in such a manner as to provide a cross sectional area for the weld between said free band ends and said adjacent thrust pieces which is greater than the cross sectional area of said side bands in an area adjacent said widened band ends; and
   wherein the middle band portion is narrowed at a region which is located adjacent the connecting portion and axially opposite the widened free band ends when said brakeband is disposed in the installed state, in such a manner as to effect an increase in a critical stress cross-section of said side bands in an area where said side bands branch off from said central connecting portion.

2. A brake band according to claim 1, wherein the connecting portion is made in one piece with the band portions.

3. Brake band according to claim 2, wherein the middle band portion is wider than either of the side band portions in the directions of the axis of rotation of the brake.

4. Brake band according to claim 2, wherein a one part thrust piece is welded to the two side band portions.

5. Brake band according to claim 4, wherein the middle band portion is wider than either of the side band portions in the directions of the axis of rotation of the brake.

6. Brake band according to claim 1, wherein a one part thrust piece is welded to the two side band portions.

7. Brake band according to claim 6, wherein the middle band portion is wider than either of the side band portions in the directions of the axis of rotation of the brake.

8. Brake band according to claim 1, wherein the middle band portion is wider than either of the side band portions in the directions of the axis of rotation of the brake.

* * * * *